United States Patent
Krumbacher

(10) Patent No.: US 9,895,814 B2
(45) Date of Patent: Feb. 20, 2018

(54) INDUSTRIAL ROBOT WITH AT LEAST ONE DRIVE

(71) Applicant: KUKA Roboter GmbH, Augsburg (DE)

(72) Inventor: Rainer Krumbacher, Rettenbach (DE)

(73) Assignee: KUKA Roboter GmbH, Augsburg (DE)

( * ) Notice: Subject to any disclaimer, the term of this patent is extended or adjusted under 35 U.S.C. 154(b) by 0 days.

(21) Appl. No.: 14/912,777

(22) PCT Filed: Aug. 12, 2014

(86) PCT No.: PCT/EP2014/067262
§ 371 (c)(1),
(2) Date: Feb. 18, 2016

(87) PCT Pub. No.: WO2015/024818
PCT Pub. Date: Feb. 26, 2015

(65) Prior Publication Data
US 2016/0193735 A1    Jul. 7, 2016

(30) Foreign Application Priority Data
Aug. 20, 2013   (DE) .......................... 10 2013 216 449

(51) Int. Cl.
*G05G 11/00*  (2006.01)
*B25J 17/00*  (2006.01)
(Continued)

(52) U.S. Cl.
CPC ............... *B25J 17/00* (2013.01); *B25J 9/102* (2013.01); *B25J 9/126* (2013.01); *B25J 19/0029* (2013.01)

(58) Field of Classification Search
CPC ........ B25J 17/00; B25J 19/102; B25J 19/126; B25J 19/0029; H02K 2213/12; H02K 5/24; H02K 7/10; H02K 7/116
See application file for complete search history.

(56) References Cited

U.S. PATENT DOCUMENTS 4,988,259 A * 1/1991 Gabillet ..................... B25J 9/06
294/192
5,293,107 A * 3/1994 Akeel ........................ B25J 9/08
310/83

(Continued)

FOREIGN PATENT DOCUMENTS

EP      1 166 974 A1    1/2002

OTHER PUBLICATIONS

European Patent Office; Search Report in International Patent Application No. PCT/EP2014/067262 dated Oct. 17, 2014; 4 pages.

*Primary Examiner* — Zakaria Elahmadi
(74) *Attorney, Agent, or Firm* — Wood Herron & Evans LLP

(57) ABSTRACT

A robotic arm of an industrial robot includes successive links connected by joints having respective drives and associated transmissions for moving the links. First and second links have respective first and second housings that transfer forces and moments arising from the weight of the robotic arm, or a load carried by the arm, to adjacent links. A first drive rotatably connecting the first and second links includes a drive housing, a rotor, and a stator connected to the drive housing. The drive housing is fastened to the first housing of the first link and forms an external wall of the robotic arm. The transmission associated with the first drive includes an input link that is joined with the rotor of the first drive. An output of the first drive is connected to a flange that is fastened to the second housing and rotatable relative to the drive housing.

15 Claims, 2 Drawing Sheets

(51) Int. Cl.
*B25J 9/10* (2006.01)
*B25J 9/12* (2006.01)
*B25J 19/00* (2006.01)

(56) References Cited

U.S. PATENT DOCUMENTS

| | | | | |
|---|---|---|---|---|
| 5,355,743 A * | 10/1994 | Tesar | ................... | B25J 9/08 475/149 |
| 7,409,891 B2 * | 8/2008 | Takemura | ............ | F16H 49/001 74/640 |
| 7,453,176 B2 * | 11/2008 | Davison | ............... | F16H 49/001 310/209 |
| 8,757,029 B2 * | 6/2014 | Negishi | ................. | B25J 9/1025 74/411 |
| 2004/0067662 A1 * | 4/2004 | Tsutsumi | ............ | B25J 19/0029 439/17 |
| 2004/0114994 A1 * | 6/2004 | Tsutsumi | ............ | B25J 19/0029 403/164 |
| 2006/0179964 A1 * | 8/2006 | Hama | ....................... | B25J 9/06 74/490.05 |
| 2007/0000894 A1 * | 1/2007 | Klein | ..................... | B23K 9/287 219/137.9 |
| 2009/0178506 A1 * | 7/2009 | Yamamoto | ............... | B25J 9/102 74/490.03 |
| 2009/0227412 A1 * | 9/2009 | Chang | ..................... | B25J 9/102 475/150 |
| 2012/0286629 A1 * | 11/2012 | Johnson | .................... | B25J 9/08 310/68 B |
| 2013/0139636 A1 * | 6/2013 | Tanioka | ............... | B25J 17/0241 74/490.05 |
| 2014/0224057 A1 * | 8/2014 | Tanaka | ..................... | B25J 9/102 74/490.05 |
| 2015/0068349 A1 * | 3/2015 | Hirabayashi | ............... | B25J 9/12 74/490.03 |

* cited by examiner

INDUSTRIAL ROBOT WITH AT LEAST ONE DRIVE

CROSS-REFERENCE TO RELATED APPLICATIONS

This application is a national phase application under 35 U.S.C. § 371 of International Patent Application No. PCT/EP2014/067262 filed Aug. 12, 2014 (pending), which claims the benefit of German Patent Application No. 10 2013 216 449.1 filed Aug. 20, 2013 (pending), the disclosures of which are expressly incorporated by reference herein in their entirety.

TECHNICAL FIELD

The invention relates to an industrial robot featuring a robotic arm designed with links, which is designed to carry a load and move it in space, with joints that by means of drives and transmissions allocated to the drives flexibly connect the links to each other, of which at least the first link features a first housing and at least a second link features a second housing, which are designed to transfer, in each case to at least the adjacent link, forces and moments that arise because of the robotic arm's and/or load's own weight, whereby the first link, in relation to the second link, is joined rotatably by means of one of the drives, and this drive features a drive housing, rotor, and additionally a stator connected to the drive housing, and the drive housing is fastened to the first housing of the first link and forms an external wall section of the robotic arm that transfers the forces and moments, whereby one of the transmissions is allocated to this drive and features an output link and an input link that is connected to the rotor of the drive.

BACKGROUND

Known from EP 1 166 974 A1 is an industrial robot with a robotic arm with drives to operate a robotic hand, whereby in the interior of this robotic arm, coaxially to the same, drives with central passages are arranged one after the other. The motor described therein features a motor housing and a transmission housing section that are joined in a torsionally fixed manner and with which the motor is likewise firmly installed in the arm, which can consist of multiple sections. Located in the motor is a stator with a stator winding. Located within the motor, rotatable via a bearing, is a hollow motor shaft that features rotor magnets on its outer circumference. The motor shaft projects above the stator at least on one side axially with a section. On this section, gearing can be mounted externally to interact with a transmission that is likewise axially located on a front side of the stator. In an embodiment, there the transmission is designed such that the projecting part of the motor shaft features an eccentric outer circumference that is furnished with a bearing and around which located on this bearing is a ring gear with external teeth, which intermeshes on the one hand with an internal gearing of the transmission housing, on the other hand with the internal gearing of a transmission output shaft positioned and oriented rotatably in the transmission housing, which in that way is driven at a lower rotational speed by the motor, respectively, its motor shaft. The output shaft continues beyond the hollow shaft. A motor output shaft can protrude through the motor. Correspondingly, the output shaft can protrude beyond the motor's opening.

SUMMARY

The object of the invention is to create an industrial robot that features a compact robotic arm.

The object of the invention is solved by an industrial robot featuring:

a robotic arm designed with links, which is designed to carry a load and move it in space, with joints that by means of drives and transmissions allocated to the drives flexibly connect the links to each other, of which at least the first link features a first housing and at least a second link features a second housing, which are designed to transfer, in each case to at least the adjacent link, forces and moments that arise because of the robotic arm's and/or load's own weight, whereby the first link, with respect to the second link, is joined rotatably by means of one of the drives, and this drive features a drive housing, rotor, and additionally a stator connected to the drive housing, and the drive housing is fastened to the first housing of the first link and forms an external wall section of the robotic arm that transfers the forces and moments, whereby one of the transmissions is allocated to this drive and features an output link and an input link that is connected to the rotor of the drive, and the output link of the transmission is connected to a flange, the flange is rotatably positioned and oriented on the drive housing, and fastened to the flange is the second housing of the second link.

Industrial robots are work machines that can be equipped with tools for the automatic handling and/or processing of objects and that by means of their joints are programmable in multiple movement axes, for example, with regard to orientation, position, and work flow.

The industrial robot features the robotic arm and a programmable control (control device) that during operation controls, respectively, regulates the industrial robot's motion sequences, in that one or multiple automatically or manually adjustable joints (robot axes) are moved through particular electrical drives, in that the control system controls, respectively, regulates the drives.

Robotic arms can, among other things, comprise a frame and carousel rotatably positioned and oriented relative to the frame by means of joint, on which a link arm is pivotally positioned and oriented by means of a different joint. At the same time, by means of another joint an arm jib can be pivotally positioned and oriented on the link arm, for its part. At the same time, the arm jib bears a robotic hand, whereby in this respect the arm jib and/or robotic hand can feature multiple additional joints.

The robotic arm featuring multiple links connected by joints can be configured as an articulated-arm robot with multiple links and joints arranged serially one after another; in particular, the robotic arm can be designed as a six-axis articulated-arm robot.

The load to be carried and moved in space by the robotic arms can constitute just a tool attached to a hand flange of the robotic am, such as a gripper, for example. Alternatively or in addition to a tool or gripper, the load, however, can also constitute a workpiece to be handled or processed. In order to be able to hold and move such a load, forces and moments must be transferred through the robotic arm's supporting structure. In particular for the creation of a load-bearing arm jib, axially extended housing bodies with hollow spaces can thus be designed, where the housing body assumes all of the forces and moments of the load and the drives, transmissions, and supply lines are located in the hollow spaces. In particular, the hollow housing bodies can be of a tubular design.

A drive and transmission can each be allocated to every joint that adjustably connects two adjacent links to each other. Every transmission serves to transform higher or lower a rotational speed or torque introduced by the drive and to enable an adjustment of the one respective link in relation to the adjacent link.

In particular, the drive can be an electrical drive that features a rotor with an electrical rotor winding and a driveshaft and a stator with an electrical stator winding, which in particular can be housed in a drive housing. In particular, the rotor can be thereby be connected to a transmission's input link by having the driveshaft, in particular a hollow shaft, connected to a transmission's hollow transmission shaft or even designed as a single part with the latter as a common hollow shaft.

By having the transmission's output link connected to a flange, the flange positioned and oriented rotatably in relation to the transmission housing, and the second housing of the second link fastened to the flange, the first link can be rotatably connected to the second link in a compact manner. In so doing, the drive and transmission can be designed in an especially space-saving manner, so that space is created in the center of the links in which the supply lines can be arranged without obstruction and safe from damage. On the other hand, if needed the links can be designed more narrowly, in particular in diameter. As a result the entire robotic arm can have a smaller interference contour and, if necessary, its weight can also be reduced.

In relation to the first link, the flange forms a rotatably positioned and oriented fitting on which the second link is fastened. The flange can feature tapped bores, for example, in particular multiple tapped bores evenly distributed around a circumference. The second link, in particular a housing of the second link, can feature bores through which screws can be screwed into the tapped bores of the flange in order to fasten the second link to the flange with screws. By having the output link of the transmission connected to the flange, torque produced by the drive and transformed via the transmission is transferred to the flange so that the flange positioned and oriented in relation to the first link can drive and thus move the second link. The flange is positioned and oriented in relation to the first link by having it rotatably positioned and oriented in relation to the transmission housing, this transmission housing being connected to the first link, respectively, even forming an integral part of the first link.

The flange can be rotatably positioned and oriented on the transmission housing. A rotatable position and orientation of the flange on the transmission housing can be effected through one or more roller bearings. At the same time, at least one inner ring of at least one roller bearing can be joined to the transmission housing or designed therewith as single piece. A radial shaft seal can be allocated to the bearing, respectively, to the roller bearing—of which there is at least one. The radial shaft seal can be designed and/or located to seal an annular gap between the flange and the transmission housing.

The flange can be oriented and positioned on an interior side of a wall section rigidly connected to the transmission housing. The wall section can be that of the transmission housing. Alternatively, the wall section can be provided on a separate component that is joined with the transmission housing. In a one-piece design, the inner side of the wall section can be formed from an inner wall of the transmission housing. Alternatively or additionally, the wall section can simultaneously form an inner ring of a roller bearing that positions and orients the flange rotatably in relation to the transmission housing.

In particular, the flange can be positioned and oriented on an inner side of a wall section that is rigidly connected to the transmission housing and forms an exterior wall section of the robotic arm that transfers the forces and moments. In a design to this effect, the wall section can be formed through that part of the transmission housing that is designed to transfer those forces and moments that arise because of the robotic arm's and/or load's own weight. In an alternative design, the wall section can be formed from a separate component, through which the forces and moments directed into and out of the transmission that arise because of the robotic arm's and/or load's own weight are transferred. In this respect, the separate component can be connected to the transmission housing here as well.

In this respect, in a special embodiment the wall section can be designed on a separate ring component, which is fastened to the transmission housing, in particular to a front wall of the transmission housing. In addition, the separate ring component can be connected to the transmission housing by means of fasteners known per se by specialists. So, for example, the separate ring component can be connected to the transmission housing by means of screws. In addition, in a concrete design, tapped bores distributed evenly over a circumference can be provided on the front side of the transmission housing, on the separate ring component through bores can be provided that correspond to the tapped bores, through which screws can be inserted and screwed into the tapped bores, in order to screw the separate ring component to the front side of the transmission housing.

In a further development, the wall section—in particular, the ring component—can be designed on or fastened to a transmission's transmission housing, in particular can be formed by the transmission's transmission housing. In particular, this can be the case if the transmission housing is connected to the drive housing, in particular directly, that is, is directly connected or even designed therewith as a single piece. In such designs where the wall section—in particular, the ring component—is designed on or fastened to a transmission's transmission housing, a rotatable positioning and orientation of the flange on the transmission housing can be effected through one or multiple roller bearings. At the same time, at least one inner ring of the roller bearing—of which there is at least one—can be connected to the flange or designed therewith as a single piece. An external ring of a roller bearing—of which there is at least one—can be connected to the transmission housing or designed therewith as a single piece. A radial shaft seal can be allocated to the bearing, respectively, to the roller bearing—of which there is at least one. The radial shaft seal can be designed and/or located to seal an annular gap between the flange and the transmission housing.

In an initial design, the rotor can feature a hollow driveshaft that is designed as a conduit for supply lines, in particular the electric lines of the drives of the industrial robot and/or supply lines of a tool borne by the robotic arm. By having the rotor feature a hollow driveshaft, a hollow-shaft motor is created through which one or more supply lines can be led via the pertinent link of the robotic arm in a manner that saves space and/or with minimal bending or torsion.

On the one hand, supply lines can be taken to mean electrical power lines, which, are also described as a robot cable harness, which include the electrical power supply lines, if applicable also signal lines to the industrial robot's drives, that is, motors. On the other hand, supply lines can be taken to mean also power supplies that include various kinds of lines, for example such as electric lines, cold and/or hot water lines, fluid and/or pressure lines, for example to tools, grippers, and/or the industrial robot's sensors. All of these specified supply lines—in individual strands and/or in cable bundles, in particular with protective hoses—can be combined into a single strand.

Alternatively or in addition to the initial design, in a further developed design the transmission's input link and/or output link can feature a hollow transmission shaft that is designed as a conduit for supply lines, in particular the electric lines of the drives of the industrial robot and/or supply lines of a tool borne by the robotic arm. By having the transmission's input and/or output link feature a hollow transmission shaft, a hollow-shaft transmission is created through which one or more supply lines can be led via the pertinent link of the robotic arm in a manner that saves space and/or with minimal bending or torsion.

Here too, on the one hand, supply lines can be taken to mean electrical power lines, which, are also described as a robot cable harness, which include the electrical power supply lines, if applicable also signal lines to the industrial robot's drives, that is, motors. Here too, on the other hand, supply lines can be taken to mean also power supplies that include various kinds of lines, for example such as electric lines, cold and/or hot water lines, fluid and/or pressure lines, for example to tools, grippers, and/or the industrial robot's sensors. All of these specified supply lines—in individual strands and/or in cable bundles, in particular with protective hoses—can be combined into a single strand.

In the various designs, the second housing of the second link can feature a housing front wall with which the second link is connected flatly to the flange, in particular is fastened to the flange.

In addition, the second link can be connected to the flange by means of fasteners known per se by specialists. So, for example, the second housing of the second link can be connected to the flange by means of screws through the housing's front wall. In addition, in a concrete design, tapped bores distributed evenly over a circumference can be provided on the front side of the flange, on the second housing through bores can be provided that correspond to the tapped bores, through which screws can be inserted and screwed into the tapped bores of the flange, in order to screw the second housing, respectively, the second link to the front side of the flange. Between the second housing and the flange, a static seal can be provided, for example, in the form of o-ring seals or flat gaskets as known per se by specialists.

In all of the various described designs, both the first housing of the first link and also the second housing of the second link can feature openings through which the supply lines can be led into and/or led out of the respective hollow spaces of these housings. Insofar as multiple links and joints of the robotic arm that follow upon each other feature the described hollow spaces and openings, the supply lines can be led through multiple links and joints along the inside of the robotic arm.

Generally, a single joint of the robotic arm can feature an inventive drive and an inventive transmission or two or more, in particular also all of the robotic arm's joints can feature inventive drives and transmissions. An inventive joint is representatively described in following for each joint of the robotic arm.

BRIEF DESCRIPTION OF THE DRAWINGS

An embodiment of the invention is illustrated in the attached schematic drawings. Shown are.

DETAILED DESCRIPTION

Figure 1:
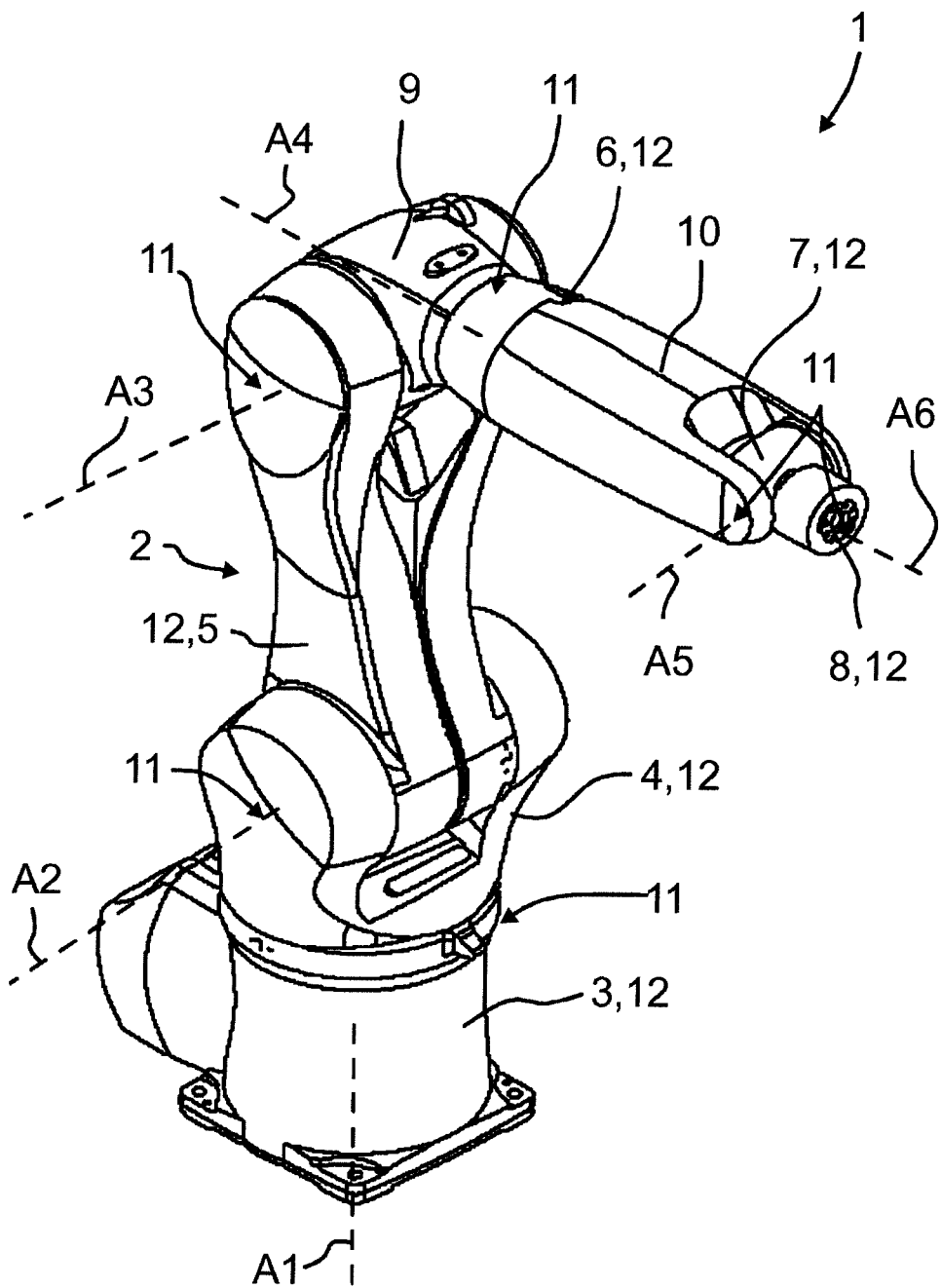
FIG. 1 a perspective view of an industrial robot with a robotic arm that features an inventive drive and inventive transmission, FIG. 2 a sectional view in the area of a typical joint of the industrial robot as per FIG. 1 with the inventive drive and the inventive transmission in a typical assembly situation.

FIG. 1 shows an industrial robot 1, that features a robotic arm 2. In the case of the present embodiment, the robotic arm 2 includes multiple links 9, 10, 12 arranged one after another and connected by means of joint 11. In the present embodiment, with regard to links 12 in particular, it involves a frame 3 and carousel 4 positioned and oriented around an axis A1 that extends vertically in relation to frame 3. In the case of the present embodiment, additional links 12 of the robotic arm 2 are, for example, a link arm 5, and an arm jib 6, and a preferably multi-axis robotic hand 7 with a mounting device designed as a connective flange 8 for mounting an end effector, which is not presented in greater detail. On the lower end, link arm 5 is pivotally positioned and oriented—that is, on joint 12 of the link arm 5, which can also be described as linked head bearing—on the carousel 4 around a preferably horizontal rotational axis A2. In turn, on the upper end of swing arm 5, pivotally positioned and oriented on an additional joint 11 of link arm 5 is the arm jib 6, likewise around a preferably horizontal rotational axis A3. On the end it bears the robotic hand 7 with its preferable three rotational axes A4, A5, A6.

In the case of the present embodiment, the arm jib 6 features a first link 9 pivotally positioned and oriented on the link arm 5. Position and oriented rotatably around the axis A4 on the first link 9 is a second link 10 of the arm jib 6.

Figure 2:
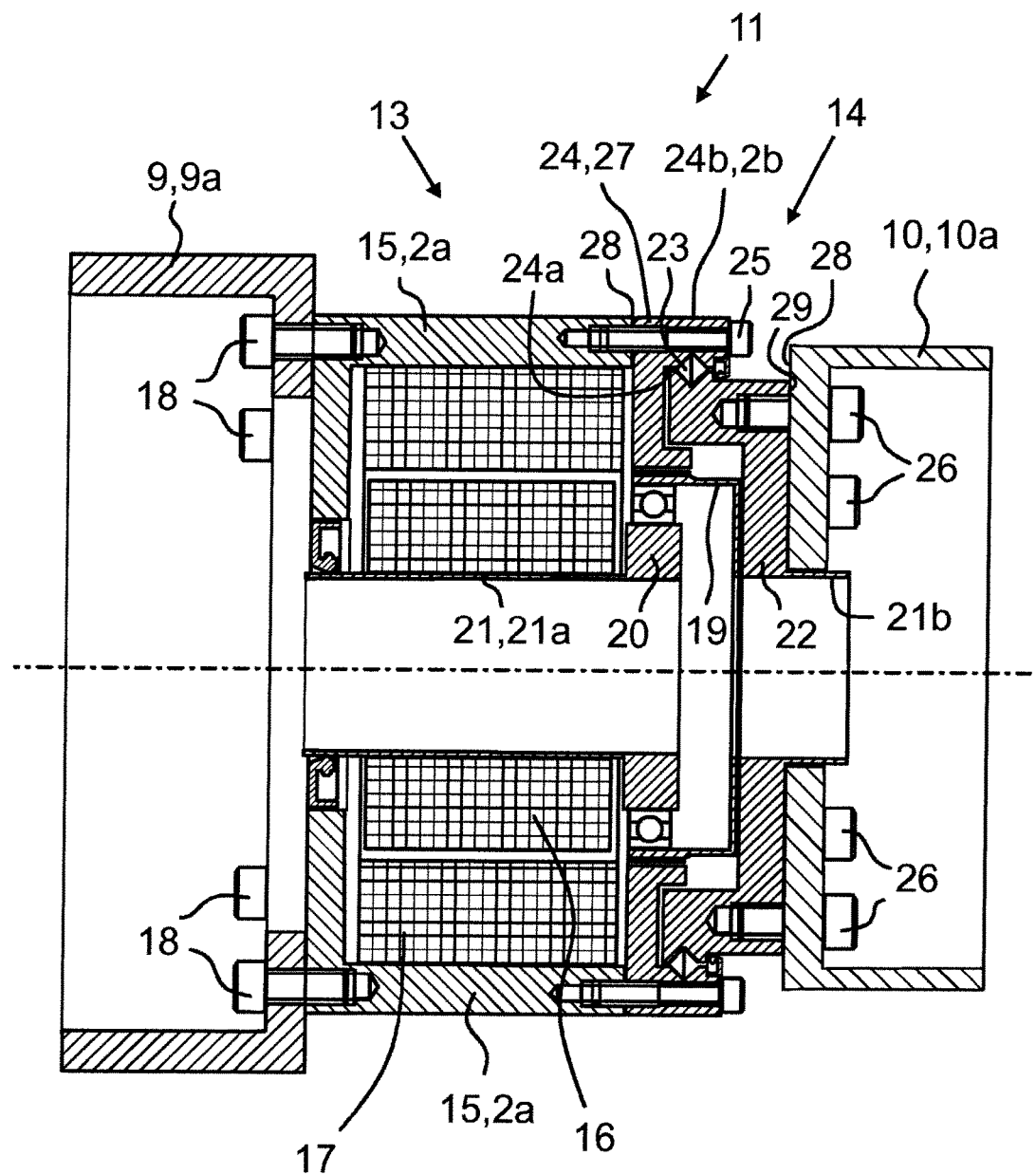

The area of the robotic arm 2, in which the first link 9 and the second link 10 are rotatably connected to each other by joints, is more closely described in FIG. 2.

FIG. 2 shows schematically the area of joint 11, which rotatably connects the first link 9 with the second link 10. The first link 9 features a first housing 9a. The second link 10 features a second housing 10a. The housings 9a, 10a are each designed to transfer forces and moments that arise because of the robotic arm's 2 and/or load's own weight, respectively to at least to an adjacent link 9, 10.

The illustrated joint 11 shows, in addition, a drive 13 and a transmission 14 allocated to this drive 13. The drive 13 and the transmission 14 are represented in a typical construction in a highly schematic manner and can be designed in various construction variants that are basically known to specialists. This pertains in particular to the arrangement and design of the bearings, such as for example a rotor bearing, of roller bearings in general, the sealing arrangements, which can include the radial shaft seals, and various designs of flange geometries and fasteners, such as screws.

The first link 9 is rotatably joined—relative to the second link 10—by means of the drive 13. In the embodiment, the drive 13 comprises a drive housing 15, a rotor 16, and in addition a stator 17 that is connected to the drive housing 15. The drive housing 15 is detachably fastened to the first housing 9a of the link 9. Intended for this purpose are the first fasteners 18 in the form of screws. The drive housing 15 forms an exterior wall section 2a of the robotic arm 2 that transfer the forces and moments.

The transmission 14 features an output link 19 and an input link 20 that is connected to the rotor 16 of drive 13. The input link 20 is connected to a first hollow shaft 21, which for its part is connected to rotor 16. The input link 20 can be designed with the hollow shaft 21 as a single piece. Alternatively, the input link 20 can be connected to the hollow shaft 21 as a separate component. The output link 19 of the transmission 14 is connected to a flange 22. The flange 22 is positioned and oriented rotatably in relation to the drive housing 15, namely, in the illustrated embodiment via a roller bearing arrangement 23, through which the flange 22 is rotatably positioned and oriented on a transmission housing 24 of the transmission 14, whereby for its part the transmission housing 24 is firmly connected to the drive housing 15. The transmission housing 24 is detachably connected to the drive housing 15. Intended for this purpose are the second fasteners 25 in the form of screws. At the same time, the transmission housing 24 forms an exterior wall section 2b of the robotic arm 2 that transfers the forces and moments. In addition, the flange 22 is connected to the second housing 10a of the second link 10, respectively, is fastened to the same. Intended for this purpose are the third fasteners 26 in the form of screws.

In the illustrated embodiment of FIG. 2, the transmission 14 is designated, by way of example, as a strain wave gear or as a harmonic drive gear. In the process, in the embodiment the input link 20 forms a shaft generator of the transmission 14, the transmission housing 24 forms an annulus gear and the output link 19 a flexible gearwheel (flex ring) of the strain wave gear.

The flange 22 is rotatably positioned and oriented on the transmission housing 24 via the roller bearing arrangement 23. In having the transmission housing 24 firmly connected to the drive housing 15 by means of the fasteners 25, the flange 22 is also positioned and oriented rotatably in relation to the drive housing 15.

The flange 22 is positioned and oriented on an inner side of a wall section 24a that is rigidly connected to the drive housing 15. At the same time, the flange 22 is positioned and oriented in particular on the inner side of the wall section 24a that is rigidly connected to the transmission housing 24, whose external side forms an exterior wall section 24b of the robotic arm 2 that transfers the forces and moments.

In the illustrated embodiment, the wall section 24a is designed on a separate ring component 27, which is fastened on the front wall 28 of the drive housing 15. In this case the separate ring component 27 is formed in this respect by the transmission housing 24.

In the embodiment, the wall section 24a, in particular the ring component 27, is thus designed on the transmission housing 24 of the transmission 14, alternatively can be fastened to it as a separate component.

The rotor 16 features a hollow driveshaft 21a, which is designed to be conduit for supply lines, in particular electrical lines of the drive 13 of the industrial robot 1 and/or supply lines of a tool borne by the robotic arm 2.

In the illustrated embodiment, the output link 19 of the transmission 14 also features a hollow transmission shaft 21b, which is designed to be conduit for supply lines, in particular electrical lines of the drive 13 of the industrial robot 1 and/or supply lines of a tool borne by the robotic arm 2.

The second housing 10a of the second link 10 features a housing front wall 28 with which, lying flat against a flange surface 29 of the flange 22, the second link 10 is connected to the flange 22, in particular fastened to the flange by means of the third fasteners 26.

What is claimed is:

1. An industrial robot, comprising:
   a robotic arm including links configured to carry and move a load in space, and joints movably connecting the links to each other by respective drives and transmissions allocated to the drives;
   wherein at least a first link comprises a first housing, and at least a second link comprises a second housing, the first and second housings configured to transfer, respectively, to at least an adjacent link, forces and moments that arise because of the weight of the robotic arm and/or the weight of the load;
   wherein the first link is rotatably joined to the second link by a first drive of the drives, and the first drive comprises a drive housing, a rotor, and a stator rigidly and non-rotatably connected to the drive housing, and the drive housing is fastened to the first housing of the first link and forms an external wall section of the robotic arm that transfers the forces and moments;
   wherein the transmission allocated to the first drive comprises an output link and an input link that is joined with the rotor of the first drive;
   the output link of the transmission is connected to a flange; and
   the flange is rotatable relative to the drive housing and fastened to the second housing of the second link.

2. The industrial robot of claim 1, wherein the flange is rotatably coupled with the drive housing.

3. The industrial robot of claim 1, wherein the flange is positioned and oriented on an inner side of a wall section rigidly connected to the drive housing.

4. The industrial robot of claim 3, wherein the wall section forms an external wall section of the robotic arm that transfers the forces and moments.

5. The industrial robot of claim 3, wherein the wall section is part of a separate ring component that is fastened to the drive housing.

6. The industrial robot of claim 5, wherein the ring component is fastened on a front wall of the drive housing.

7. The industrial robot of claim 5, wherein the wall section is part of, or is fastened to, a transmission housing of the transmission.

8. The industrial robot of claim 7, wherein the ring component is part of, or is fastened to, a transmission housing of the transmission.

9. The industrial robot of claim 7, wherein the wall section is formed by the transmission housing of the transmission.

10. The industrial robot of claim 1, wherein the rotor comprises a hollow driveshaft configured as a conduit for supply lines.

11. The industrial robot of claim 10, wherein the hollow driveshaft is configured as a conduit for at least one of:
    electric lines of the drives; or
    supply lines of a tool carried by the robotic arm.

12. The industrial robot of claim 1, wherein at least one of the input link or the output link of the transmission comprises a hollow transmission shaft that is configured as a conduit for supply lines.

13. The industrial robot of claim 12, wherein the hollow transmission shaft is configured as a conduit for at least one of:
    electric lines of the drives; or
    supply lines of a tool carried by the robotic arm.

14. The industrial robot of claim 1, wherein the second housing of the second link comprises a housing front wall by which the second link is coupled flatly to a flange surface of the flange.

15. The industrial robot of claim 14, wherein the housing front wall is fastened to the flange surface of the flange.

* * * * *